F. S. CULVER.
SYSTEM OF ELECTRICAL DISTRIBUTION.
APPLICATION FILED JUNE 9, 1909.

969,345.

Patented Sept. 6, 1910
3 SHEETS—SHEET 2.

UNITED STATES PATENT OFFICE.

FRANK S. CULVER, OF MADISON, WISCONSIN.

SYSTEM OF ELECTRICAL DISTRIBUTION.

969,345.  Specification of Letters Patent.  Patented Sept. 6, 1910.

Application filed June 9, 1909. Serial No. 501,112.

*To all whom it may concern:*

Be it known that I, FRANK S. CULVER, a citizen of the United States, residing at Madison, in the county of Dane and State of Wisconsin, have invented certain new and useful Improvements in Improved Systems of Electrical Distribution, of which the following is a specification.

This invention relates to an improved method of and apparatus for controlling the generation, storing and supplying of electrical energy for light, heat, power, and translating devices generally, and is especially adapted for use with an irregular or varying source of power, such as explosion engines, windmills, moving vehicles, etc., and one of the objects of the same is to provide an improved system of this character in which storage cells for supplying the service mains are automatically charged from a generator in accordance with the current consumption.

A further object is to provide improved means for connecting the generator with the cells when the speed of the generator is sufficient to produce a voltage sufficiently high to charge the cells and for disconnecting the cells again when the voltage drops too low for charging the cells, at the same time maintaining a constant voltage in the service mains or circuit.

A further object is to provide improved means for maintaining a supply of electrical energy in the system regardless of whether or not the generator is operating, and improved means for automatically adjusting or regulating the supply when additional translating devices are cut in or out of the circuit.

A further object is to provide an improved centrifugal switch for automatically connecting the generator field.

A further object is to provide an improved apparatus of this character which will be simple, durable and cheap in construction and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating an embodiment of the invention, and in which—

Figures 9, 10:
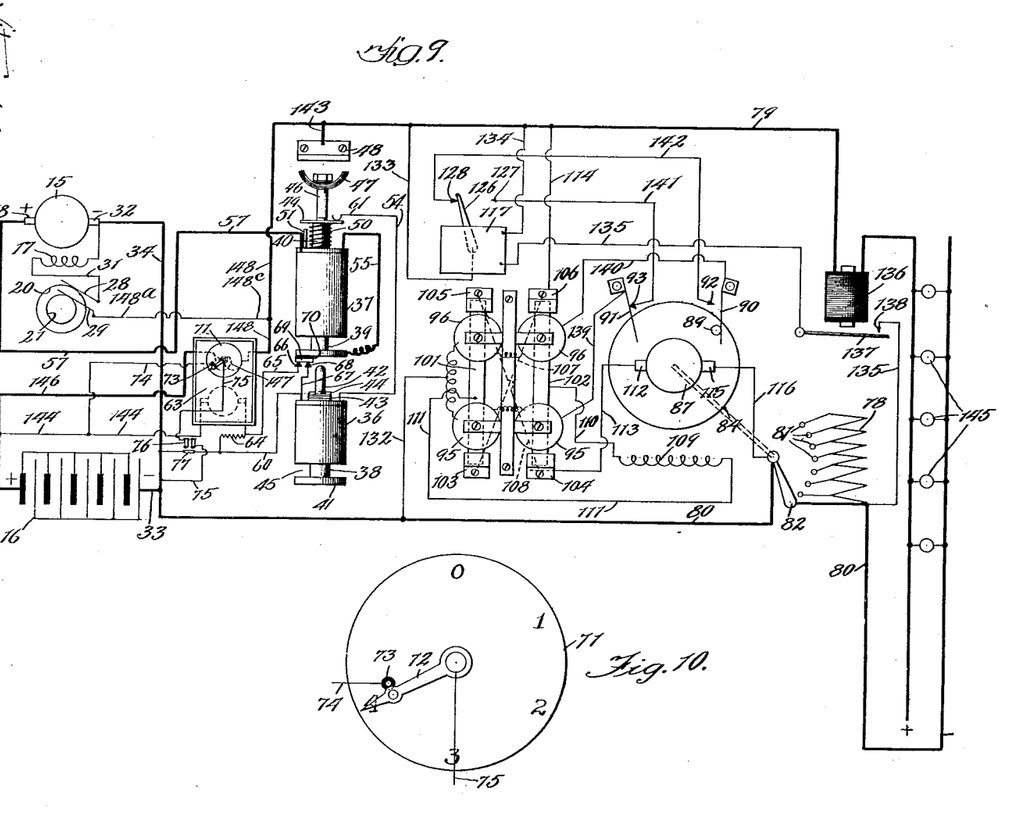
Fig. 9 is a diagrammatic view of the wiring of the apparatus.
Fig. 10 is an elevation of the meter.

In the exemplification of the invention shown in the drawings, the generator 15, shown in diagram in Fig. 9, is preferably a plain shunt machine, although it is to be understood that considerable change may be made in this respect without departing from the spirit of the invention.

The storage cells 16 may be of the standard make and grouped in any combination to give the desired voltage and current capacity. These cells are arranged in series with the generator and in order to close the battery circuit on to the field so as to prepare or put the generator in condition to be thrown onto the cells so that the cells will be charged thereby, when the generator has reached its proper speed, there is provided a centrifugal switch shown in Figs. 6 and 7. This switch is adapted to close the field circuit 17 of the generator onto the battery only when the speed of the generator is sufficiently high to give a charging voltage and also operates to prevent a waste of the battery current in the field of the generator when the speed of the motor decreases. This switch comprises a support 18 to which is secured a hub 19, which latter in turn is secured in any suitable manner to the generator shaft to rotate therewith. Secured to the periphery of the support 18 are spaced metallic collector rings 20, 21. An arm 22 is pivotally connected at one extremity as at 23 to the support 18 and is provided at its other end with a weight 24 which tends to throw the arm 22 outwardly about its pivot 23 by centrifugal force when the support 18 is rotated. The travel of the arm 22 is controlled by a spring 25, one end of which is secured to the arm 22 beyond its pivot and the other end is anchored to the support 18. Supported by the free extremity of the arm 22 is an elastic contact 26 preferably in the form of a spring which engages the collector ring 20 when the arm is thrown outwardly and the spring 25 is so adjusted that it necessitates a certain or predetermined speed to throw the spring 26 into engagement with the collector ring. By providing the spring 25, the circuit will be prevented from being opened when the generator is running, due to vibration. Mounted upon a suitable support 27 are brushes 28, 29, which respectively engage the collector rings 20, 21, on their outer periphery. The collector ring 21 is electrically connected by means of a conductor 30 with the arm 22 preferably through the pivot 23 thereof so that when the generator reaches its proper speed to throw the brush or spring 26 into engagement with the collector ring 20, the path of current will be through the brush 29, collector ring 21, conductor 30, pivot 23, arm 22, contact 26, collector ring 20, brush 28 and out through the conductor 31 to one terminal of the field coil 17 of the generator 15. The opposite terminal of the field coil 17 is connected to the negative terminal 32 of the generator and also to the negative terminal 33 of the battery through the medium of the conductor 34. Whenever the generator is running at a speed below the normal speed or when the generator is at rest, the arm 22 will be drawn by the spring 25 against the stop 35, thereby opening the circuit of the field 17.

Figures 1, 2, 3, 4, 11:
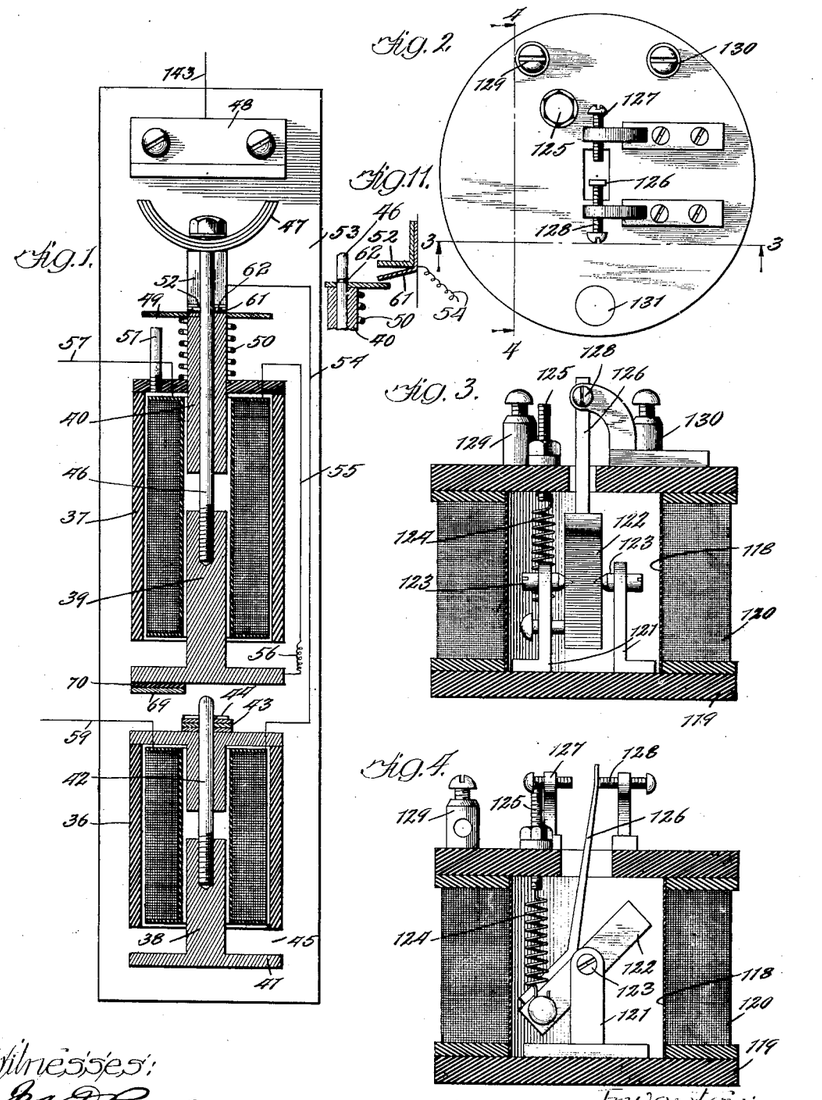
Figure 1 is a detail sectional view of the switch operating mechanism for cutting the cells into the generator circuit.
Fig. 2 is a top plan view of the relay for controlling the voltage in the system.
Fig. 3 is a sectional view on line 3—3 of Fig. 2.
Fig. 4 is a sectional view on line 4—4 of Fig. 2.
Fig. 11 is a detail sectional view of the switch contact for controlling the shunt magnet of the cut in and a portion of the plunger for operating the switch.

In order to connect the cells 16 to the generator 15 to charge the cells when the generator is running at the proper speed, or to disconnect the cells from the generator, the switch operating mechanism, or "cut in" shown in Fig. 1 is employed. When a variable driving power is employed to operate the generator 15, the result will be a variable voltage which means that the cells must be cut on for charging when the generator voltage is high enough to charge the cells and cut off again when the voltage is too low for charging. This cutting off of the generator circuit must occur at the proper moment or current will flow back from the cells into the generator and thus discharge the cells. This "cut in" or switch mechanism comprises a shunt wound magnet 36 and a series wound magnet 37, which may be of any desirable or suitable type. These magnets are preferably arranged one above the other as shown, and the lower or shunt wound magnet is provided with a single plunger 38 and the upper or series wound magnet 37 is provided with two plungers 39, 40. The head 41 of the plunger 38 is arranged below the magnet 36 and the plunger is provided with an extension 42 which extends beyond the top of the magnet and surrounding the extension on the top of the magnet are washers 43 which are held against displacement by means of a suitable pin 44 which passes through the extension and these washers are provided for the purpose of adjusting the air gap 45 between the head of the plunger 38 and the end of the magnet so that the plunger 38 will be drawn up toward the magnet when the generator voltage is sufficient to charge the batteries.

The lower plunger 39 of the series wound magnet 37 is provided with a stem 46 which passes freely through the upper plunger 40 and extends beyond the plunger, and secured to the upper end of the stem is a switch member 47 preferably comprising a series of superimposed leaf springs, which latter are adapted to engage a stationary contact 48 when the plunger 39 is raised. The upper plunger 40 is provided with a head 49 spaced from the magnet 37 and an elastic member 50, such as a coil spring or the like, is provided, which surrounds the plunger and is interposed between the magnet 37 and the head 49 for normally raising the plunger 40 and moving it away from the plunger 39. The plunger 40 is adapted to be moved downwardly against the tension of the elastic member 50 when the magnet is energized and the downward travel of this plunger is limited by means of a suitable stop 51 which is adapted to be engaged by the head 49 and the upward movement of the plunger under the influence of the spring 50 is limited by a stop 52 which is preferably secured to the base 53 which supports the magnets. One end of the coil of the shunt wound magnet 36 is connected to the stop 52 as at 54 and one end of the coil of the series wound magnet 37 is connected as at 55 to the plunger 39 and a portion of the conductor 55 is coiled as at 56 adjacent the plunger to form a flexible connection. The other end of the coil of the series wound magnet 37 is connected by means of the conductor 57 to the positive brush 58 of the generator, as shown in the diagrammatic view and the other end of the shunt wound magnet 36 is connected by means of the conductors 59, 60 to the negative side of the cells 16 and the negative brush 32 of the generator by being tapped into the conductor 34. Affixed to the under side of the stop 52 is a flat spring 61, one extremity of which is free to travel toward and away from the stop and is adapted to be engaged by the plunger 40 and serves to gradually arrest the movement of the plunger under the influence of the elastic member 50. A pin 62 is provided which extends through the stem 40 for arresting the downward movement of the lower plunger 39.

The purpose of the shunt magnet 36 is to move the switch member 47 against the contact 48 by the plunger 38, which latter is moved toward the plunger 39 when the magnet 36 is energized, to close the circuit through the cells when the proper voltage exists and the lower plunger 39 of the series wound magnet 37 will be maintained in its adjusted position when the proper voltage exists to hold the switch member 47 in engagement with the contact member 48 so long as the current is flowing into the cells. When current ceases to flow into the cells the magnets will be deënergized to permit the plungers to drop, which will move the switch member 47 out of engagement with the contact 48 to open the circuit. The purpose of the upper plunger 40 of the series magnet is to open the circuit of the shunt wound magnet 36 after the cell circuit has been closed and current starts to flow into the cells. When the coil of the series wound magnet 37 is energized, the plungers 39 and 40 will be drawn toward each other thereby lowering the plunger 40 until it engages the stop 51, which movement will open the circuit through the shunt wound magnet 36, thereby deënergizing the latter to permit the plunger 38 thereof to drop to normal. As the current ceases to flow to the cells, the magnet 37 will be deënergized and the upper plunger 40 will be moved under the influence of the elastic member 50 into engagement with the stop 52, thereby closing the circuit through the shunt wound magnet 36, which is the normal position of the "cut in" or switch operating mechanism, so that it will be ready to operate again as soon as the generator voltage is of proper value.

The energy meter, designated generally by the reference numeral 63, in Fig. 9, is preferably an ampere hour meter, although if desired an ordinary watt meter may be used. This meter is of the ordinary construction and is preferably provided with a train of recording gears adapted to show at all times the amount of charge in the cells and this is accomplished by so connecting the circuit with the meter that when the cells are being charged, the recording train will run ahead and when current is being discharged or drawn from the cells the meter armature reverses its direction of rotation, thus causing the train to run backward toward zero.

As it is impossible to take from the battery all the energy put into it, it becomes necessary to provide means which will automatically cause the meter to run faster when the cells are being discharged than when they are being charged. The ratio of speeds should be the ratio of the cell efficiency and this is accomplished by providing a resistance 64 in the circuit of the meter motor armature, which resistance is cut out of the meter armature circuit when the cells are discharging, thus causing the armature to revolve faster. A conductor 65 leads from the resistance 64 and is provided with a contact 66 arranged adjacent the head of the plunger 39 of the series magnet 37 of the "cut in" or switch operating device, and a conductor 67 is tapped into the conductor 60 and is provided with a contact 68 adjacent and spaced from the contact 66. Supported by the head of the plunger 39 is a conductor strip 69 shown in the diagram in Fig. 9 which conductor strip is insulated from the plunger 39 by suitable insulation 70. When the current is flowing through the series wound magnet 37, the plunger 39 will be raised and the current flowing through the circuit of the meter motor armature will be through the resistance 64 to retard the advancing movement of the armature but when no current is flowing to the cells, the magnet 37 will be deënergized and the plunger 39 will drop to the position shown in the diagram in Fig. 9, and also in Fig. 1 to cause the contact 69 to engage the contacts 66, 68, thereby causing a short circuit across the armature circuit resistance of the meter.

Any suitable means may be provided for stopping the charge to the cells after a full charge has been given. A simple and efficient means for accomplishing this purpose will now be described. The dial 71 of the meter 63 is divided into any suitable number of divisions and numbered consecutively in clockwise direction and a hand 72 moves over the face of the dial. The divisions represented on the dial indicate the amount of charge and a contact post 73 is provided which is supported by the dial and insulated therefrom and is arranged at such a point on the dial that when a full charge has been given to the cells, the indicating hand 72 will have reached and will engage the contact posts 73. The contact post 73 may be connected to one of the conductors from the battery through the medium of the conductor 74, and the hand 72 is connected by means of another conductor 75 to the other conductor from the battery and an electro-responsive device 76 may be provided within this circuit which electro-responsive device is adapted to control a circuit breaker 77 preferably located in the circuit of the shunt coil 36 of the "cut in" or main switch operating mechanism, so that when the indicator hand 72 engages the contact 73, which it will do when the battery is fully charged, the circuit will be completed through the electro-responsive device 76 to trip and hold the circuit breaker to interrupt the current through the shunt coil. While this circuit breaker is shown as located in this particular circuit, it is to be understood that any other suitable mechanism may be employed for preventing the overcharging of the cells. As soon as the circuit is thus interrupted, when the cells begin to discharge the indicator hand 72 will start to move backward from the contact post 73 toward the zero, thus opening the circuit at the post 73 which will release the circuit breaker 77 so that the system will be ready to supply another charge to the cells when the generator is again started. With a battery of twenty-six cells, for instance, the variation in voltage from normal open circuit voltage, to charging voltage, would be about twenty-two volts but such a variation in voltage is not suitable for lighting purposes and it therefore becomes necessary to provide a regulator that will maintain a constant pressure at the lighting circuit under all conditions. This may be accomplished by means of a variable resistance 78 which is wired into the main lighting circuit 79, 80, and is provided with a plurality of contacts 81 over which a contact arm 82 is adapted to travel. This contact arm 82 is preferably provided with an enlarged head 83 which preferably extends over two or more of the contacts at the same time so that as the contact arm advances to cut in or out the resistance coils, sparking will be prevented.

Figures 6, 8:
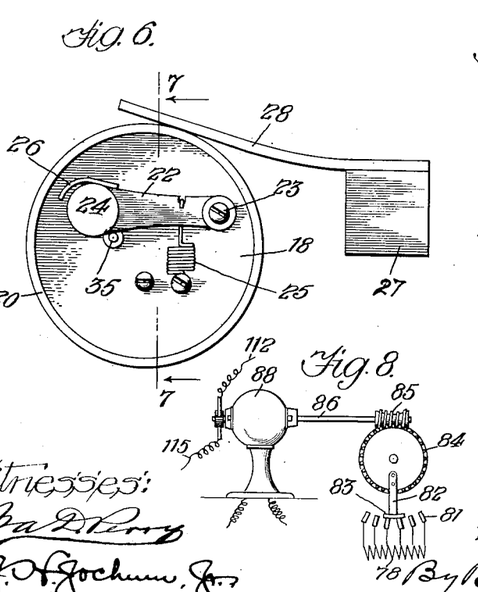
Fig. 6 is an elevation of the centrifugal switch for closing the field circuit of the generator onto the battery.
Fig. 8 is a diagrammatic view of the regulator arm and motor for operating the arm to cut out the resistance from the main line.
Figure 7:
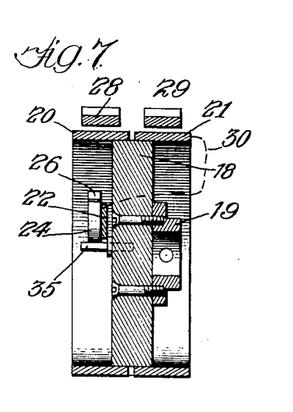
Fig. 7 is a detail sectional view on line 7—7 of Fig. 6.

The contact arm 82 is supported and operated by means of a worm gear 84, which in turn is driven by a worm 85 on a shaft 86, on which shaft the armature 87 of the motor 88 is secured. The worm 84 is provided with a laterally projecting pin or extension 89 which is adapted to move between two spring contacts 90, 91, which latter are respectively adapted to be moved into and out of engagement with corresponding contacts 92, 93, so that when the worm moves in one direction it will engage and move one of the contacts (the contact 90) out of engagement with the contact 92 and the contact 91 will engage the contact 93. When the gear moves in the opposite direction the pin or extension 89 will move away from the contact 90 to permit the latter to engage the contact 92 and will engage the spring contact 91 and move it out of engagement with the contact 93.

Figure 5:
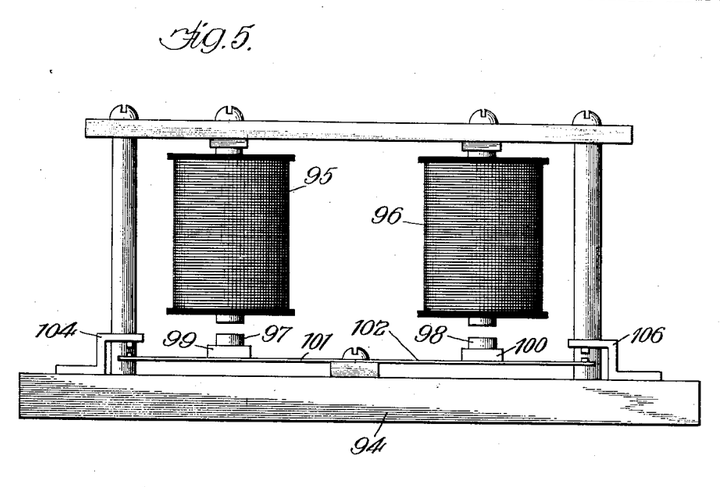
Fig. 5 is an elevation of the magnets for controlling the direction of rotation of the regulating motor.

In order to automatically control the motor and to reverse the same, reversing magnets, designated generally by the reference numeral 94 in Fig. 5, are provided and this reversing mechanism preferably comprises two pairs of electro-magnets 95, 96, and these magnets are respectively provided with armatures 97, 98, which latter are mounted upon insulating members 99, 100, and these insulating members are respectively attached to the extremities of springs 101, 102. The springs are secured to a suitable support located intermediate their ends and this support is mounted upon a suitable insulating base. Arranged above the extremities of these springs or elastic members 101, 102 and supported by the insulating base are contacts 103, 104, 105, 106, so that whenever the magnets 95 are energized, the extremities of the springs 101 102 adjacent thereto will be attracted and move into engagement with the contacts 103, 104 and when the magnets 92 are energized, the other ends of the springs 101, 102 will be attracted so as to be brought into engagement with the contacts 105, 106. The contacts 103, 104, 105, and 106 are cross connected, that is, the contact 103 is connected by means of a conductor 107 with the contact 106, and the contact 104 is connected by means of a conductor 108 with the contact 105, as shown clearly in the diagrammatic view.

One of the terminals of the field 109 of the controller motor 88 is connected by means of a conductor 110 to the spring 102 and the other terminal of the field 109 is connected by means of a conductor 111 to the other spring 101. One of the terminals 112 of the armature 87 of the motor 88 is connected by means of the conductor 113 to the contact 104 and also to the contact 105 by means of the conductor 108, and the line 79 is connected by means of the conductor 114 to the contact 106 and also the contact 103 through the conductor 107. The other terminal 115 of the armature is connected by means of the conductor 116 to the opposite side 80 of the line.

In order to balance the circuit should the voltage become too high or too low (if lights are being used) and to control the reversing mechanism to control the direction of rotation of the regulating motor 88, a shunt relay, designated generally by the reference numeral 117 in the diagrammatic view and as shown in detail in Figs. 2 to 4, is employed. This relay comprises a spool 118 which is mounted upon a suitable insulating base 119 and is wound by fine wire 120. Arranged within the spool and pivotally supported intermediate its ends by means of supports 121 is an armature 122 of soft iron adapted to swing freely on the pivots 123. The armature 122 is normally held in a plane inclined to the horizontal and whenever a current passes around the spool, a magnetic field will be set up which tends to move the armature about its pivot and into a position parallel to the lines of force. Opposing these lines of force or torque, is a spring 124, one end of which is connected to the lower side of the armature and the other end is attached to an adjusting screw 125. A contact arm 126 is affixed to the armature 122 and its upper extremity is adapted to move freely between adjustable contacts 127, 128, which latter are supported by the insulating head of the spool and the terminals of the winding of the spool are connected to the binding posts 129, 130.

The adjustment of the spring 124 is such that when a normal voltage is applied to the coil terminals, the contact arm 126 will stand midway between the contacts 127, 128, and the contacts are so adjusted that a rise or fall in the voltage of one or more volts will cause the contact arm 126 to move into engagement with the contacts 127, 128 respectively. A binding post 131 is also provided which is electrically connected with the contact arm 126 through the medium of one of the supports 121 of the armature 122. A neutral connection is provided between the magnets 95, 96 of the reversing mechanism 94 shown in Fig. 5 through the medium of the conductor 132, which latter conductor is connected to the conductor 80 on one side of the main line and the conductor 133 is connected with the conductor 79 on the other side. One of the terminals to the winding of this relay 117 is connected by means of the conductor 134 to the conductor 79 on one side of the main line, and the other terminal of the winding of this relay is connected by means of the conductor 135 to the other conductor 80 on the other side of the main line. If this shunt relay as above described should be permanently connected to the lighting circuit, the current would flow through its coil continually and as it is only necessary to place this relay in action at such times as the lights are being used, a series relay is provided for automatically cutting the shunt relay into and out of the circuit, thereby preventing waste of current. This series relay may be of the ordinary and well known construction and comprises one or more electro-magnets 136 and is connected in the circuit so that the entire lighting current will pass through the coils. The armature 137 of this magnet is arranged in the conductor 135 and coöperates with the contact 138. When the magnet 136 is energized the armature 137 will be attracted so that it will engage the contact 138 to complete the circuit through the relay 117. When the magnet 136 is deënergized or there is no load, the armature 137 will fall or move out of engagement with the contact 138 to break the circuit through the relay.

One of the spring contacts of the regulator motor 88, preferably the contact 91, is connected by means of a conductor 139 to one of the pairs of coils, preferably the pair 95 of the reversing mechanism 94, shown in Fig. 5, and the other spring contact 90 is connected by means of the conductor 140 to the other pair of coils 96 of this mechanism and these pairs of coils are arranged so that one pair will operate the motor in one direction when the voltage is high and the other pair will operate the motor in the opposite direction when the voltage is low.

The contact 127 (high voltage contact) of the shunt relay 117 with which the contact arm 126 coöperates is connected by means of a conductor 141 to the contact 93 with which the spring contact 91 coöperates and the contact 128 (low voltage contact) of the relay 117 is connected by means of a conductor 142 to the contact 92 with which the spring contact 90 coöperates.

Certain conditions may arise, such as a heavy overload which will cause the regulator motor 88 to move the contact arm 82 to the extreme end of its travel in either direction and still not be able to adjust the voltage to normal. Under such conditions the shunt relay contact arm 126 would remain in contact with either the high or low contact 127, 128, as the case may be, thus causing current to flow needlessly through the magnets of the reversing mechanism 94. To prevent such a waste of current the spring contacts 90, 91 are provided, which are controlled by the worm gear 84 of the controller motor 88, one of these spring contacts being connected into the circuit of one of the pairs of magnets of the reversing mechanism and the other spring contact being connected in the circuit of the other pair of magnets of the reversing mechanism. As the worm gear 84 will make only about one-fourth of its revolution for a complete movement of the regulator contact arm 82, the insulated pin or projection 89 is provided on the gear for operating these contacts. In the position shown in the diagram the contact arm 82 has traveled to the end of the regulator contacts 81 and the insulated pin 89 has moved the spring contact 90 out of engagement with the contact 92, thereby breaking the circuit at that point. The opening of the circuit at this point does not in any manner affect the operation of the opposite end of the reversing mechanism 94. Should the voltage become high (if the lights are being used) sufficient current would flow through the relay 117 to move the contact arm 126 thereof into engagement with the "high voltage" contact 127, thereby permitting current to flow through the high contacts 91, 93, of the regulator motor to the "high voltage" magnets 95 of the reversing mechanism 94, thus starting the motor in the opposite direction. As the motor starts to reverse the insulating pin 89 will be moved out of engagement with the contact 90 which latter will move into engagement with the contact 92, which is connected with the "low voltage" contact 128 of the relay, to complete the circuit through the other series of magnets of the reversing mechanism when the arm 126 of the relay 117 moves into engagement with the contact 128, the normal position of the contact arm 126 being midway between the contacts 127, 128 when the voltage which controls the relay 117 is normal.

The contact 48 with which the switch member 47 coöperates is connected to the conductor 79 on one side of the main line and one terminal of the watt meter armature is connected to the conductor 79 by the conductor 148. The other terminal of the armature of the meter 63 is connected by means of the conductor 144 to the positive side of the cells 16.

Referring to the wiring diagram the circuits under the various conditions existing according to the position of the various parts will be as follows: In this wiring diagram all of the lamps 145 will be assumed to be turned off and the parts will be in the positions shown. The plunger 39 of the series magnet 37 will be lowered so that the conductor strip 69 will engage the contacts 66, 68, so that the only path for the current to flow will be from the positive side of the battery cells 16, through the conductor 144, armature of the meter 63, conductor 65, contact 66, conductor 69, contact 68, conductor 60, back to the negative side of the battery. Assuming now that one or more lights 145 are turned on and the generator being idle, the current can then flow as just above set forth. A second path for the current will then be established from the positive side of the battery through the conductor 146, through the series coil 147 of the meter 63, conductor 148, to the conductor 79 on one side of the lighting circuit to the series relay 136, from the relay to the positive side of the lamp circuit, through the lamp or lamps 145 to the negative side of the circuit, then to the regulator resistance 78, through the regulator arm 82 into the conductor 80, on the other side of the main line back to the negative side of the battery 16 through the conductor 33. Current passing through the magnets 136 will energize the same and the armature 137 will be attracted so that it will engage the contact 138, thereby creating another path for the circuit which places the shunt relay 117 into action. The third path or the path just established of the circuit will then be as follows: from the positive side of the battery 16, through the conductor 146, series coils 147 of the meter 63, conductor 148, to the conductor 79 on one side of the main line circuit to the point where the conductor 134 is tapped into the line, through the conductor 134, relay 117, conductor 135, armature 137, contact 138, conductor 135, series regulator 78, regulator arm 82, conductor 80, conductor 33 to the negative side of the battery. Assuming the voltage to be high, the conductor arm 126 of the series relay will be moved into engagement with the contact 127 and the fourth path for the current will be as follows: from the positive side of the battery 16, conductor 146, series coils 147 of the meter 63, conductor 148, to the conductor 79 on one side of the main lighting circuit, to the point where the conductor 133 is tapped into the main line, through the conductor 133, contact arm 126 of the shunt relay 117, contact 127, conductor 141, contact 93, spring contact 91, conductor 139, to the high voltage magnets 95 of the reversing mechanism, from the magnets 95 through the conductor 132 to the conductor 80 on the other side of the lighting circuit, through conductor 33 to the negative side of the battery.

The passing of the current through the magnets 95 will cause the armature 97 thereof to be attracted, thereby completing a circuit from the conductor 79, conductor 114, contact 106, conductor 107, across to the contact 103, spring 101, conductor 111, through the field 109 of the regulating motor 88, conductor 110, spring 102, contact 104, conductor 113, terminal 112 of the regulator motor, terminal 115 of the motor, conductor 116, and conductor 80 on the other side of the main line circuit. This circuit will start the motor to operate to move the regulator 82 to cut the resistance 78 into the main line. As the resistance is cut in the voltage of the line will drop at the lighting circuit to normal and the armature or contact arm 126 of the relay 117 will assume a normal position, thus breaking the circuit at the contact 127, which causes the armatures of the magnets 95 of the reversing mechanism to drop, which in turn open the circuit to the regulating motor 88, causing the latter to stop. Should some of the lights 145 be now turned off, the voltage would rise still farther to cause the contact arm 126 of the shunt relay 117 to move into engagement with the high voltage contact 127, which would close the circuit to the set of magnets 95, or high voltage magnets to operate the motor, so that the circuit operating the motor would then be as follows: from the main line 79, conductor 114, contact 106, spring 102, contact 110, in the opposite direction through the field 109 of the motor, contact 111, spring 101, contact 105, conductor 108, across to the contact 104, conductor 113, terminal 112 of the motor armature, terminal 115, conductor 116, conductor 80 on the opposite side of the main line, back to the battery.

If all the lamps 114 have been turned out the series relay 136 will be deënergized and the armature 137 thereof will drop or move out of engagement with the contact 138, which in turn will deënergize the shunt relay 117 thereby permitting the spring 124 thereof to hold the contact arm 126 of the shunt relay in contact with the "low voltage" contact 128. The regulator motor will thus continue to run and the contact arm 126 will remain in engagement with the contact arm 128 until the insulated pin 89 moves into engagement with the spring contact 91 to move the latter out of engagement with the contact 93 to break the circuit at that point, thereby deënergizing the magnets 96 of the reversing mechanism 94. Assuming now that the generator 15 is started. As soon as the speed of the generator reaches the proper value, the arm 22 of the centrifugal switch will be thrown outwardly until the contact 26 engages the collector ring 20, which will close the circuit through the field 17 of the generator so that the current will be free to flow from the positive side of the battery through the conductor 146, series coil 147 of the meter 63, conductor 148, to the conductor 148ª, to the centrifugal switch, from the switch through the conductor 31, to the shunt field 17 of the generator 15 and out through the conductor 34, back through the conductor 33 to the negative side of the battery. The field of the generator now being excited, the armature voltage will build up and as soon as the proper voltage is reached, the current will flow as follows: from the positive terminal 58 of the generator armature, through the conductor 57, through the series wound magnet 37, of the "cut in", out through the conductor 55, through the lower plunger 39 of the magnet, through the stem 46 on the plunger, through the plunger 40, to the head 49 on the upper plunger, through the contact 61, through the conductor 54, to the shunt wound magnet 36, from the magnet 36, through the conductor 60, conductor 34, back to the negative brush 32 of the generator 15.

Current passing through the shunt wound magnet 36 will energize the same to draw up the plunger 38 thereof, to cause the stem 42 to engage the plunger 39 of the series wound magnet 37 to move the latter and bring the switch member 47 into engagement with the contact 48 which will close the battery circuit on to the generator so that the battery will be charged therefrom and the current will then flow in the following paths: from the positive side of the generator 15, contact 58, conductor 57, series wound magnet 37, conductor 55, plunger 39, stem 46, switch member 47, contact 48, conductor 143, conductor 79, magnet 136 to the positive side of the lamp circuit, to negative side of the lamp circuit conductor 80 and contact arm 82, conductor 80 and conductor 34 to the negative contact 32 of the generator 15. From the point where the contact 48 joins the main line 79, through conductor 143 the currents will divide and part will also flow through conductor 148, meter series field 147, conductor 146, to positive side of the cells 16 through the cells out through the conductor 33, through conductor 34 to the negative contact 32 of the generator 15. The current will also flow through the conductor 148, conductor 148ᶜ, conductor 148ª, brush 29, collector ring 29, collector ring 20, brush 28, conductor 31 and field coil 17 to the negative contact 32 of the generator 15. The current will flow in this manner until the indicator hand 72 on the dial 71 of the meter 63 moves into engagement with the contact pin 73 which will establish a local circuit from the positive side of the battery through the conductor 144, conductor 74, pin 73, hand 72, conductor 75, through the electro-responsive device 76 and back to the negative side of the battery, which will energize the electro-responsive device 76, thereby causing it to attract and hold the switch 77 so as to open the circuit through the shunt wound magnet of the "cut in." When the battery begins to discharge the hand 72 will move out of engagement with the contact 73 to break the local circuit to reëstablish the circuit through the shunt wound magnet.

When the battery circuit is completed onto the generator, the current will circulate through the series wound magnet 37, to draw the plungers 40 and 39 toward each other until they are in magnetic contact. This movement will open the circuit of the shunt wound magnet 36 at 61 and the plunger 38 of the shunt wound magnet will drop to a normal position. So long as the current flows from the generator into the battery both of the plungers 39, 40, will remain in magnetic contact, but should the current fall off to nothing, or nearly so, the lower plunger 39 will drop, thus opening the battery charging circuit and preventing the current from flowing back into the generator. The upper plunger 40 will then be forced upward to its normal position so that its head 49 will engage the contact 61 under the influence of the elastic member 50.

In order that the invention might be fully understood, the details of the foregoing embodiment thereof have been thus specifically described, but

What is claimed as new is—

1. In an apparatus of the character described, the combination of a cut-in comprising an electro-responsive device, a circuit therefor, a plunger controlled by the electro-responsive device, a switch member movable by and electrically connected with the plunger, a second electro-responsive device, a shunt circuit for the said second electro-responsive device, a plunger controlled by the last said electro-responsive device, said plunger being adapted to engage and move the plunger of the first said electro-responsive device, and a second plunger controlled by the first said electro-responsive device for controlling the circuit through the second said electro-responsive device.

2. In an apparatus of the character described, the combination of a cut-in comprising an electro-responsive device, a circuit therefor, a plunger controlled by the electro-responsive device and switch member operated by and electrically connected with said plunger, a second electro-responsive device, a shunt circuit for the last said electro-responsive device, a plunger controlled by the last said electro-responsive device, adapted to engage and move the plunger of the first said electro-responsive device, a second plunger controlled by the first said electro-responsive device adapted to be moved thereby in one direction to open the circuit of the second said electro-responsive device, and means for moving the plunger in the opposite direction to close the circuit of the second said electro-responsive device.

3. In an apparatus of the character described, the combination of a cut-in comprising an electro-responsive device, a circuit therefor, a plunger controlled by the electro-responsive device, a switch member operated by and electrically connected with said plunger, a second electro-responsive device, a shunt circuit for the last said electro-responsive device, a plunger controlled by the last said electro-responsive device adapted to engage and move the plunger of the first said electro-responsive device, a second plunger controlled by the first said electro-responsive device adapted to be moved thereby in one direction to open the circuit of the second said electro-responsive device, and mechanical means for moving the plunger in the opposite direction to normally close the circuit of the second said electro-responsive device.

4. In an apparatus of the character described, the combination of a cut-in comprising an electro-responsive device, a circuit therefor, a plunger controlled by the electro-responsive device, a switch member operated by and electrically connected with said plunger, a second electro-responsive device, a shunt circuit for the last said electro-responsive device, a plunger controlled by the last said electro-responsive device adapted to engage and move the plunger of the first said electro-responsive device, a second plunger controlled by the first said electro-responsive device adapted to be moved thereby in one direction to open the circuit of the second said electro-responsive device, and a stop for limiting the movement of said plunger, and elastic means for moving the plunger in the opposite direction and tending normally to close the circuit of the second said electro-responsive device.

5. In an apparatus of the character described, the combination of a cut-in comprising a pair of electro-responsive devices, one of said devices having a shunt circuit, a plunger controlled by the shunt device, a pair of plungers controlled by the other electro-responsive device, a switch member operated by and electrically connected with one of the pair of plungers, said plunger being adapted to be engaged and moved by the plunger of the shunt electro-responsive device, and means whereby the other of the pair of plungers will automatically control the circuit of the said shunt electro-responsive device.

6. In an apparatus of the character described, the combination of a cut-in comprising an electro-responsive device, a pair of oppositely movable plungers controlled by said device, a switch member operable by one of said plungers, a second electro-responsive device, a shunt circuit therefor, a plunger operable by the second said electro-responsive device and adapted to engage and move one of the plungers of the first said electro-responsive device to shift the switch member, a circuit for the first said electro-responsive device for maintaining the plunger and switch in their shifted positions, a cut-out in the shunt circuit adapted to be opened by the other plunger of the first said electro-responsive device when said device is energized to permit the plunger of the said second electro-responsive device to return to a normal position, and means tending normally to move the said other plunger to close the shunt circuit.

7. In an apparatus of the character described, the combination of a cut-in comprising an electro-responsive device, a pair of oppositely movable and electrically connected plungers controlled by said device, a switch member operable by one of said plungers, a second electro-responsive device, a shunt circuit therefor, a plunger operable by the second said electro-responsive device and adapted to engage and move one of the plungers of the first said electro-responsive device to shift the switch member, a circuit for the first said electro-responsive device for maintaining the plunger and switch in their shifted position, a cut-out in the shunt circuit adapted to be opened by the other plunger of the first said electro-responsive device when said device is energized to permit the plunger of the said second electro-responsive device to return to a normal position, and means tending normally to move the said other plunger to close the shunt circuit.

In testimony whereof I have signed my name to this specification, in the presence of the subscribing witnesses, on this 3rd day of June A. D. 1909.

FRANK S. CULVER.

Witnesses:
JOSEPH M. BOYD,
LOUISE M. CODDINGTON,
JOHN D. VAN SLYKE.